3,636,011
11β-FLUORO-19-NOR-STEROIDS AND PROCESS FOR THEIR PREPARATION

Gordon Hanley Phillipps, Greenford, and Alan Tulley, Liverpool, England, assignors to Glaxo Laboratories Limited, Middlesex, England
No Drawing. Continuation-in-part of application Ser. No. 572,694, Aug. 16, 1966. This application June 24, 1969, Ser. No. 836,139
Claims priority, application Great Britain, Aug. 16, 1965, 35,005/65
Int. Cl. C07c *169/06, 169/30*
U.S. Cl. 260—397.3                                             9 Claims

ABSTRACT OF THE DISCLOSURE

11β-fluoro-19-nor-steroids are prepared by reacting the corresponding 11α-hydroxy-19-nor-steroids with a fluorinating agent in an inert solvent. The novel 11β-fluoro-19-nor-steroids exhibit hormonal activity.

---

This application is a continuation-in-part of application Ser. No. 572,694 filed Aug. 16, 1966, and now abandoned.

This invention relates to novel 19-nor-steroids and to a process for their production.

We have found that 9α-unsubstituted 19-nor-steroids having a fluorine atom in the 11β-position and an oxo, protected oxo, hydroxyl or protected hydroxyl group in the 3-position and possessing a double bond in the 4,5-position or, except when there is a 3-hydroxy, 3-oxo or 3-protected oxo group, double bonds in the 3,4- and 5,6-positions, are of pharmacological interest, especially having regard to their hormonal activity.

The possession of an 11β-fluorine substituent enhances the hormonal action of the compounds. Those compounds having an aliphatic or araliphatic group at the 17-position, for example a methyl, ethyl, ethynyl, chloroethynyl or acetyl group and which may also have a hydroxy or acyloxy group at the 17-position, show progestational activity but may additionally show some androgenic/anabolic activity. Those compounds which possess an oxo, hydroxy or acyloxy group at the 17-position but no aliphatic or araliphatic group at the 17-position show androgenic/anabolic activity.

According to the present invention, therefore, there are provided 9α-unsubstituted 11β-fluoro-19-nor-steroids having an oxo, protected oxo, hydroxy or protected hydroxy group at the 3-position and possessing a double bond in the 4,5-position or, except when there is a 3-hydroxy, 3-oxo or 3-protected oxo group, double bonds in the 3,4- and 5,6-positions.

The new steroids according to the invention may carry various ring substituents, for example in the 17-position a hydroxyl group, a protected hydroxyl group, an oxo group, or a protected oxo group, or an aliphatic or araliphatic group in the presence or absence of a hydroxyl or protected hydroxyl group.

Where the protected hydroxyl groups are acyloxy, groups these may be substituted or unsubstituted aliphatic cycloaliphatic, araliphatic or aryl acyloxy groups, for example acetoxy, hexahydrobenzoyloxy, β-phenylpropionyloxy or benzoyloxy groups.

Other protected hydroxyl groups include ethers e.g. alkoxy groups having 1–5 carbon atoms, or aralkoxy or aryloxy groups, especially arylmethoxy groups such as benzyloxy groups. Protected oxo groups include ketal groups, e.g. ethylenedioxy groups and enol ether groups such as enol methyl ether groups.

The aliphatic groups which may be present in the 17-position preferably contain 1–9 carbon atoms and may, for example, be substituted or contain unsaturation. Substituents which may be present include for example, oxo groups, as in acyl groups, halogen atoms (e.g. chlorine) or hydroxy or acyloxy groups. Useful aliphatic substituents thus include methyl, ethyl, propyl, allyl, ethynyl, chloroethynyl, acetyl, acyloxyacetyl groups etc.

Particularly useful steroids according to the invention include the 3 - oxo-$\Delta^4$-11β-fluoro-19-nor-steroids and of these 11β-fluoro-oestr-4-ene-3,17-dione is especially interesting both for its androgenic acivity and its utility as an intermediate in the preparation of related compounds having other substituents in the 3- and/or 17-positions. As indicated above 17-aliphatic substituents, in particular 17-ethynyl groups, are especially useful in conferring progestational activity to the molecule.

Other especially active compounds according to the invention include:

17α-ethynyl-11β-fluoro-oestr-4-ene-3β,17β-diol
17α-ethynyl-11β-fluoro-oestr-4-ene-3β,17β-diol diacetate
17α-ethynyl-11β-fluoro-3-methoxyoestra-3,5 (6)-dien-17β-ol
17α-ethynyl-11β-fluoro-19-nortestosterone
17β-acetoxy-17α-ethynyl-11β-fluoro-oestr-4-ene-3-one
17α-acetoxy-11β-fluoro-19-norpregn-4-ene-3,20-dione According to a still further feature of the invention we provide pharmaceutical composition comprising one or more of the 9α-unsubstituted 11β-fluoro-19-nor-steroids according to the invention together with a pharamaceutical carrier or excipient. In the case of the progestational compounds one or more further active compounds, e.g. hormones, may be present advantageously hormones having cestrogenic activity.

The compositions are preferably in the form of dosage units, e.g. tablets, capsules, ampoules or suppositories and may contain, for example gelatin, lactose, starch, talc, magnesium stearate, hydrogenated oil, a polyglycol, a suppository base, sterile, pyrogen-free water, parenterally acceptable oils or other non-oqueous media or oil-containing emulsions or suspending, dispersing, stabilising, emulsifying solubilising or buffering agents.

The new compounds according to the invention may be administered by the oral, rectal, intravaginal or parenteral route. Oral administration is preferred, advantageously by such oral dosage unit forms as are mentioned above. The administration is preferably daily, and the progestational compounds used in contraceptive formulations, are preferably given as a single daily dose.

The new steroids according to the invention may be prepared in any convenient way. According to a still further feature of the invention there is provided a process for the preparation of the 9α-unsubstituted 11β-fluoro-19-nor-steroids according to the invention in which a 9α-unsubstituted-11α-hydroxy-19-nor-steroid having at the 3-position an oxo, protected oxo, hydroxyl or protected hydroxy group and possessing a 4,5-double bond or, except when there is a 3-hydroxy, 3-oxo or 3-protected oxo group, double bonds in the 3,4- and 5,6-positions, is reacted with a reagent of the general formula

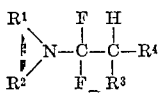

where R¹ and R², which may be the same or different, are alkyl groups having 1–5 carbon atoms or aralkyl or aryl groups, or, together with the nitrogen atom to which they are attached, comprise a heterocyclic radical which may, if desired, contain further hetero-atoms, R³ is a chlorine or fluorine atom,
R⁴ is a chlorine or fluorine atom or a trifluoromethyl group.

The fluorinating reagents of the above general formula include

N-(2-chloro-1,1,2-trifluoroethyl)diethylamine,
N-(1,1,2,2-tetrafluoroethyl)diethylamine,
N-(2-chloro-1,1,2-trifluoroethyl)dimethylamine,
N-(2-chloro-1,1,2-trifluoroethyl)dipropylamine,
N-(2-chloro-1,1,2-trifluoroethyl)diisobutylamine,
N-(2-chloro-1,1,2-trifluoroethyl)dioctylamine,
N-(2-chloro-1,1,2-trifluoroethyl)methylethylamine,
N-(2,2-dichloro-1,1-difluoroethyl)diethylamine,
N-(1,1,2,3,3,3-hexafluoropropyl)diethylamine,
N-(1,1,2,2-tetrafluoroethyl)diisopropylamine,
and the like.

The reagent of choice is N-(2 chloro-1,1,2-trifluoroethyl)-diethylamine.

The fluorinating agents of the above general formula have been used previously to replace hydroxy groups by fluorine atoms but, in the steroid field, attempts to replace the 11α-hydroxy group by fluorine have led generally to elimination and the production of 9,11-unsaturated compounds as the main product. The starting steroids previously used in this reaction have possessed an angular methyl group in the 10-position and it is now believed that this group substantially affects the course of the reaction since reaction of the above fluorinating agents with 11α-hydroxy-19-nor-steroids give the desired fluoro-compound in good yield.

The fluorination is preferably effected in an inert solvent, that is any solvent which does not react with the fluorinating agent, for example aromatic and aliphatic hydrocarbons, halogenated hydrocarbons, esters, ketones, nitriles, ethers and tertiary alcohols. Examples of such solvents are benzene, toluene, chlorobenzene, methylene chloride, pentane, hexane, cyclohexane, ethyl acetate, butyl acetate, acetone, acetonitrile, methyl ethyl ketone, tetrahydrofuran, diethyl ether, diethylene glycol dimethyl ether, t-butyl alcohol, t-amyl alcohol, and the like. Since the starting materials are frequently only slightly soluble in non-polar solvents, a polar solvent such as tetrahydrofuran is preferred.

Unless further fluorine substituents are required, hydroxyl groups initially present in the steroid should be protected, for example by esterification, etherification etc.

Particularly preferred starting compounds are the 11α-hydroxy-3-oxo-Δ⁴-19-nor-steroids; of these 11α-hydroxy-oestr-4-ene-3,17-dione, is of especial interest in view of the importance of the corresponding 11β-fluoro-compound.

The 11α-hydroxy-19-nor-steroids may be prepared in any convenient way. Thus, for example, the 11α-hydroxy group may be introduced into a 19-nor-steroid having no 11-substituent by microbiological methods e.g. using organisms such as *Aspergillus ochraceus* and *Rhizopus nigricans*.

The preferred method of preparing the 11α-hydroxy steroids used as starting compounds is to react a 9-hydro-steroid with diborane followed by reaction of the boron complex so formed with, for example, alkaline hydrogen peroxide. The diborane may be generated in situ by reaction of a borohydride, e.g. an alkali metal borohydride, and a Lewis acid such as BF₃, but where these reagents will give unwanted reactions with other groups present, the diborane is preferably generated externally. This latter procedure is preferred, for example, when 17-ethyl-ene-ketals are used. Certain groups may be reduced by the diborane e.g. a 17-ketone group and if such reduction is undesirable, these reducible groups should first be protected. Ketone groups can conveniently be converted into ketals for this purpose.

The diborane reaction may be effected on the 9-dehydro-19-nor steroid corresponding to the 11α-hydroxy steroid required for the fluorination reaction or it may be effected at an earlier stage. Where it is desired to prepare 3-oxo-Δ⁴-11α-hydroxy-19-nor-steroids it is especially convenient to start from 9-dehydro-oestrane 3-ethers having an aromatic A-ring. By reacting such aromatic steroids with diborane as described above and oxidising the product one obtains the corresponding 11α-hydroxy-oestrane 3-ether which can then be converted into the desired 3-oxo-Δ⁴-11α-hydroxy-19-nor-steroid by reduction with an alkali metal or alkaline earth metal, preferably lithium, in liquid ammonia in the presence of a substance liberating protons in liquid ammonia, for example an alcohol, followed by acid hydrolysis to convert the 3-enol ether group to ketone. Primary, secondary or tertiary alcohols may be used, for example ethanol or t-butanol; the latter being especially effective. The corresponding Δ²,⁵⁽¹⁰⁾-3-ether is first formed from the aromatic 3-ether but in isolating the product, the 3-ether is converted to hydroxyl and rearrangement gives the required Δ⁴-3-oxo-steroid. It is possible to isolate a minor proportion of the corresponding 3-oxo-Δ⁵⁽¹⁰⁾-steroid, which is the keto form of the Δ²,⁵⁽¹⁰⁾-3-hydroxy steroid which would be the initial hydrolysis product of the Δ²,⁵⁽¹⁰⁾-3-ether.

Where groups are present which would be effected by any of the above reagents it is desirable to protect these initially. Thus, for example, in the preparation of the preferred compound 11β-fluoro-oestr-4-ene-3,17-dione it is especially convenient to start from a 9-dehydro-oestrone ether, e.g. the methyl ether, but it is first preferred to protect the 17-oxo group, for example by ketal formation. Otherwise, the metal/ammonia reduction or the diborane reaction would reduce the 17-oxo group to hydroxyl and eventually the fluorination reaction would introduce a fluorine atom at the 17-position which may not be desired.

The preferred route from 9-dehydro-oestrone methyl ether to 11β-fluoro-oestr-4-ene-3,17-dione is shown in the following reaction scheme

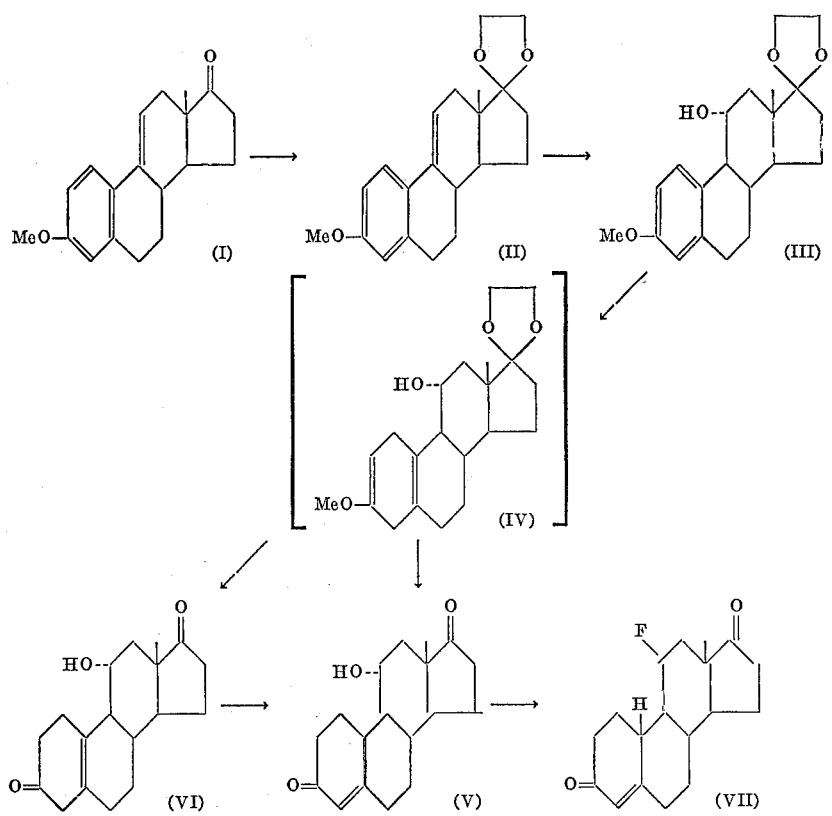

The 9-dehydro-ether I is converted into its wetal II by reaction, for example, with ethylene glycol in acid medium. The Compound II in its optically active form has not been described previously.

The Compound II may then be converted to the 11α-hydroxy Compound III by reaction with diborane and oxidation e.g. with alkaline hydrogen peroxide as described above. The Compound III is also new.

Compound III is then reacted with lithium in liquid ammonia in the presence of an alcohol to give after acid hydrolysis, predominantly, the 3-oxo-Δ⁴-steroid V, mixed with a minor proportion of the 3-oxo-Δ⁵⁽¹⁰⁾-steroid VI. Compound VI is a new substance. It is presumed that the 3-methoxy-Δ²,⁵⁽¹⁰⁾-steroid IV is formed as an intermediate but in hydrolysing the 17-ketal group, the 3-methoxy group is also hydrolysed and in the greater part of the product the 5(10)-double bond moves to the 4-position in conjugation with the 3-oxo group. The Compounds V and VI can be separated chromatographically.

The 11α-hydroxy steroid is finally converted to the corresponding new 11β-fluoro Compound VII as described above.

Δ⁴-11β-fluoro-19-nor-steroid-3,17-diones such as Compound VII can be treated further to introduce various groupings at the 17-position, where necessary after selective protection of the 3-oxo-group. Thus, for example it is possible to convert to the corresponding 3-enol ether, e.g. by reaction with an enol-etherifying agent such as 2,2-dimethoxypropane in the presence of acid, e.g. toluene-p-sulphonic acid. The double bonds in the enol ether are in the 3 and 5(6)-positions. Other methods of protecting the 3-oxo-group include formation of a ketal or thioketal or a hydrazone such as a semicarbazone. The nature of the protecting system will clearly be chosen having regard to the subsequent reactions which are to be effected.

The 3-enol ethers may then, for example, be reduced e.g. with a borohydride reducing agent, such as an alkali metal borohydride, to convert the 17-oxo group to hydroxyl. The 17-hydroxy-3-enol ether can then be converted to the corresponding 3-oxo-Δ⁴-steroid by hydrolysis e.g. with mineral acid. If desired, the 17-hydroxy group can be acylated before or after hydrolysis of the enol ether grouping e.g. with an acylating reagent such as an acyl halide or anhydride.

The 17-oxo-3-enol ethers can also be reacted with organo metallic reagents to introduce a 17α-hydrocarbon substituent together with a 17β-hydroxy group. Thus, for example, an acetylide, e.g. an alkali metal acetylide may be used to give the corresponding 17α-ethynyl-17β-hydroxy derivative or reaction with a Grignard reagent may be used to give the 17α-alkyl-17β-hydroxy-compound. Again the 17-hydroxy group can, if desired, be acylated before or after hydrolysis of the enol ether grouping.

If desired, the 3-oxo group can be reduced to hydroxyl, for example using a borohydride reducing agent and acylation will yield the corresponding 3-acyloxy derivative for example the acetate or benzoate. The borohydride reduction can be carried out in the presence of a conjugated double bond and, for example, Δ⁴-3-ketones can be reduced in this way. In this way it is possible to convert 17α-ethynyl - 11β - fluoro-17β-hydroxy-oestr-4-ene-3-one into 17α - ethynyl - 11β - fluoro-oestr-4-ene-3β,17β-diol-3,17-diacetate which is a new compound of interest in the antifertility field.

For the better understanding of the invention the following examples are given by way of illustration only; all temperatures are in ° C.

EXAMPLE 1

17,17-ethylenedioxy-3-methoxyoestra-1,3,5(10,9(11)-tetraene

3 - methoxyoestra - 1,3,5(10),9(11) - tetraen-17-one (74 g.), ethylene glycol (2.4 litres) and toluene-p-sulphonic acid (0.7 g.) were boiled together under reflux for 5 hours at 105°/18 mm. in a nitrogen atmosphere. The ketal (82 g., 97%), isolated by addition of the mixture to water containing sodium bicarbonate was crystallised from methanol containing pyridine to give irregular prisms, M.P. 146–147°, [α]$_D$+63° (c. 0.85 in chloroform), λ max. 262–263 mμ (ε 18,800) and 296–297 mμ

($\epsilon$ 3,840). (Found (percent): C, 77.6; H, 8.2. $C_{21}H_{26}O_3$ requires (percent): C, 77.3; H, 7.9)

EXAMPLE 2

17,17-ethylenedioxy-3-methoxyoestra-1,3,5(10)-trien-11α-ol

Diborane, generated by addition of sodium borohydride (160 g.) in diglyme(diethylene glycol dimethyl ether) (1600 ml.), to boron trifluoride etherate (420 ml.) in diglyme (390 ml.), was passed, in a stream of nitrogen, through a solution of 17,17-ethylenedioxy-3-methoxyoestra-1,3,510),9(11)-tetraene (82 g.) in tetrahydrofuran (910 ml.) at 0° (2.5 hour). The mixture was treated cautiously with 2 N-sodium hydroxide (2 litres), and ethanol (780 ml.), followed by hydrogen peroxide (100 vol., 780 ml.). After refluxing the mixture (1 hr.) the product was isolated with ether to give the 11α-hydroxy compound (87 g., 100%) as a froth; $[\alpha]_D -97°$ (c. 0.32 in chloroform), $\lambda$ max. 274–276 m$\mu$ ($\epsilon$ 2,650) and 285 m$\mu$ ($\epsilon$ 1,530). The product was crystallised from ether (B.P. 40–60°) to give prisms, M.P. 82°, $[\alpha]_D -107°$ (c., 0.99 in chloroform), $\lambda$ max. 276–277 m$\mu$ ($\epsilon$, 1,780), 285–286 m$\mu$ ($\epsilon$, 1,480). (Found (percent): C, 73.0; H, 8.1. $C_{21}H_{28}O_4$ requires (percent): C, 73.2; H, 8.2.)

With acetic anhydride and pyridine the product formed the 11α-acetate which was a distillable oil, B.P. 180–200° 0.05 mm.; $[\alpha]_D -122°$ (c. 1.2 in chloroform), $\lambda$ max. 224 m$\mu$ ($\epsilon$ 8,900), 276 m$\mu$ ($\epsilon$ 2,100 and 285 m$\mu$ ($\epsilon$ 1,700). (Found (percent): C, 71.5; H, 8.0. $C_{23}H_{30}O_5$ requires (percent): C, 71.5; H, 7.8.)

EXAMPLE 3

11α-hydroxyestr-4-ene-3,17-dione and 11α-hydroxyestr-5(10)-ene-3,17-dione 17,17 - ethylenedioxy-3-methoxyestra-1,3,5(10)-trien-11α-ol (22 g.) in tetrahydrofuran (320 ml.) was added to a solution of lithium (23 g.) in liquid ammonia (2 litres) and t-butanol (220 ml.). After 5 hours the reaction was quenched with ethanol (800 ml.) and the solvents removed in vacuo and the 1:4-dihydro steroid was isolated by extraction with ether. The product was hydrolysed in methanol (1 litre) by concentrated hydrochloric acid (80 ml.) in water (240 ml.) on heating the solution under reflux for 3 hours. The methanol was evaporated off in vacuo and isolation of the steroid with chloroform, and crystallisation from ethyl acetate gave 11α-hydroxyestr-4-ene-3,17-dione (8.2 g., 45%), M.P. 207–209°, $[\alpha]_D +22°$ (c. 0.9 in chloroform), $\lambda$ max. 238–239 m$\mu$ ($\epsilon$ 15,850. (Found (percent): C, 75.1; H, 8.5. $C_{18}H_{24}O_3$ requires (percent): C, 75.0; H, 8.4).

Chromatography of the crystallisation residues on Florisil (magnesium trisilicate) gave 11α-hydroxyestr-5(10)-ene-3,17-dione, which crystallised as irregular prisms (acetone), M.P. 200–201°, $[\alpha]_D +72°$ (c. 1.2 in chloroform). (Found (percent): C, 74.4; H, 8.2. $C_{18}H_{24}O_3$ requires (percent): C, 75.0; H, 8.4.)

EXAMPLE 4

11β-fluoro-oestr-4-ene-3,17-dione

A solution of 11α-hydroxyoestr-4-ene-3,17-dione (15 g.) in tetrahydrofuran (300 ml.) was treated with N-(2-chloro-1,1,2-trifluoroethyl) - diethylamine (25 ml.) and the solution was boiled under reflux for 6 hours. The product was isolated with chloroform and crystallised from methanol to give 11β-fluoro-oestr-4-ene-3,17-dione as prisms (6.7 g., 45%), M.P. 173–174°, $[\alpha]_D +148°$ (c. 0.8 in chloroform), $\lambda$ max. 237 m$\mu$ ($\epsilon$ 17,300). (Found (percent): C, 74.6; H, 8.2. $C_{18}H_{23}FO_2$ requires (percent): C, 74.5; H, 8.0.)

EXAMPLE 5

11β-fluoro-3-methoxyoestra-3,5(6)-dien-17-one

A mixture of 11β-fluoro-oestr-4-ene-3,17-dione (1 g.), dimethylformamide (5 ml.), 2,2-dimethoxypropane (5 ml.), methanol (0.2 ml.) and toluene-p-sulphonic acid (0.03 g.) was boiled under reflux for 1.5 hr. The product was isolated by addition of the mixture to water containing sodium bicarbonate, and was crystallised from methanol, containing pyridine, to give 11β-fluoro-3-methoxyoestra-3,5(6)-dien-17-one as rectangular prisms (0.66 g., 62%), M.P. 169–170°, $[\alpha]_D +86°$ (c. 1.07 in chloroform), $\lambda$ max. 240–241 m$\mu$ ($\epsilon$ 20,500). (Found (percent): C, 75.3; H, 8.4. $C_{19}H_{25}FO_2$ requires (percent): C, 75.0; H, 8.3.)

EXAMPLE 6

17α-ethynyl-11β-fluoro-3-methoxyoestra-3,5(6)-dien-17β-ol

A solution of sodium acetylide in liquid ammonia was prepared by dissolving sodium (1.25 g.) in liquid ammonia (200 ml.) and passing acetylene through the solution (3 hr.) in presence of ferric nitrate (0.02 g.). 11β-fluoro-3-methoxyoestra-3,5(6)-dien-17-one (1.47 g.), in tetrahydrofuran (50 ml.), was added and after 1 hr. ammonium chloride (4 g.) was added. Isolation of the product with ethyl acetate gave 17α-ethynyl-11β-fluoro-3-methoxyoestra-3,5(6)-dien-17β-ol (1 g., 65%) which crystallised as prisms from aqueous methanol, M.P. 129–130°, $[\alpha]_D -218°$ (c. 0.76 in dioxan); $\lambda$ max. 240–241 m$\mu$ ($\epsilon$ 21,300). (Found (percent): C, 76.2; H, 8.2. $C_{21}H_{27}FO_2$ requires (percent): C, 76.3; H, 8.2.)

EXAMPLE 7

17α-ethynyl-11β-fluoro-19-nortestosterone

17α-ethynyl-11β-fluoro - 3 - methoxyoestra-3,5(6)-dien-17β-ol (0.5 g.) in methanol (50 ml.) was treated with concentrated hydrochloric acid (0.5 ml.) and water (10 ml.) and the mixture was boiled under reflux for 30 min. The methanol was evaporated in vacuo and the steroid was isolated by extraction with chloroform to give 17α-ethynyl-11β-fluoro-19-nortestosterone (0.27 g., 57%) which crystallised as prisms from acetone; M.P. 245° (change of crystal form at 200°), $[\alpha]_D +15°$ (c. 0.8 in chloroform), $\lambda$ max. 238 m$\mu$ ($\epsilon$ 17,400). (Found (percent): C, 75.8; H, 7.8. $C_{20}H_{25}FO_2$ requires (percent): C, 75.9; H, 8.0.)

EXAMPLE 8

11β-fluoro-3-methoxyoestra-3,5(6)-dien-17β-ol

11β - fluoro-3-methoxyoestra-3,5(6)-dien-17-one (0.2 g.) in methanol (2 ml.) was treated with sodium borohydride (0.05 g.) and the solution was boiled under reflux for 15 min. The methanol was evaporated in vacuo, the solution was diluted with water and the steroid filtered to give 11β-fluoro-3-methoxyoestra-3,5(6)-dien-17β-ol (0.13 g., 64%), which crystallised from methanol as prisms, M.P. 115–118°, $\lambda$ max. 240 m$\mu$ ($\epsilon$ 19,800). (Found (percent): C, 74.5; H, 8.9. $C_{19}H_{27}FO_2$ requires (percent): C, 74.1; H, 8.9.)

EXAMPLE 9

11β-fluoro-19-nortestosterone

11β - fluoro-3-methoxyoestra-3,5(6)-dien-17β-ol (0.15 g.) in methanol (15 ml.) was treated with hydrochloric acid (0.15 ml.) in water (5 ml.) at 100° for 1 hour under reflux. The methanol was evaporated in vacuo and the steroid isolated by extraction with ether to give 11β-fluoro-19-nortestosterone (0.078 g., 54%) which crystallised as prisms (from acetone); M.P. 181–183°, $[\alpha]_D +97°$ (c. 0.8 in chloroform), $\lambda$ max. 238–239 m$\mu$ ($\epsilon$ 17,100).

EXAMPLE 10

11β-fluoro-17α-methyl-3-methoxyoestra-3,5(6)-dien-17β-ol

A solution of 11β-fluoro-3-methoxyoestra-3,5(6)-dien-17-one (0.626 g.) in tetrahydrofuran (14.5 ml.) was added to a solution of methyl-magnesium iodide, prepared by the reaction of methyl iodide (1.55 ml.) with magnesium (0.57 g.) in ether (14.5 ml.). The solution was boiled under reflux for 1 hour, a saturated solution of ammonium chloride (5 ml.) was added, and the organic phase was washed with saturated sodium bicarbonate and water. Evaporation of the solvent and three recrystallisations of the residue from methanol gave 11β-fluoro-17α-methyl-3-methoxyoestra-3,5(6)-dien-17β-ol as solvated needles (0.124 g., 19%), M.P. 105–115°, $[\alpha]_D$—104° (c. 0.44 in $CHCl_3$); λ max. 240–241 mμ (ε 18,400). (Found (percent): C, 74.0; H, 9.4.
$C_{20}H_{29}FO_2 \cdot 1/3CH_2OH$
requires (percent): C, 73.8; H, 9.2.)

EXAMPLE 11

11β-fluoro-17β-hydroxy-17α-methyloestr-4-ene-3-one

11β - fluoro-17α-methyl-3-methoxyoestra-3,5(6)-dien-17β-ol (0.23 g.) in methanol (15 ml.) was heated under reflux (1 hr.) with concentrated hydrochloric acid (0.15 ml.) and water (5 ml.). The solvents were evaporated in vacuo and the product, isolated with ether, was recrystallised from acetone-light petroleum (B.P. 40–60°) to give 11β-fluoro-17β-hydroxy-17α-methyloestr - 4 - ene-3-one (0.074 g., 34%) as prisms, M.P. 143–145°, $[\alpha]_D+52°$ (c. 0.14 in $CHCl_3$); λ max. 238–239 mμ (ε 14,800). (Found (percent): C, 74.2; H, 8.5. $C_{19}H_{27}FO_2$ requires (percent): C, 74.5; H, 8.9.)

EXAMPLE 12

11β-fluoro-19-nortestosterone β-phenyl-propionate

11β-fluoro-19-nortestosterone (0.15 g.) in a mixture of benzene (0.56 ml.) and pyridine (0.14 ml.) was treated in a nitrogen atmosphere with a solution of β-phenylpropionyl chloride (0.084 ml.) in benzene (0.28 ml.). After being left at 25° for 6 hr. the mixture was diluted with benzene and the mixture was washed with 2 N-hydrochloric acid, 2 N-sodium hydroxide and water. Evaporation of the benzene gave 11β-fluoro-19-nortestosterone β-phenylpropionate which crystallised as prisms (0.074 g.; 34%) from ether-light petroleum (B.P. 40–60°); M.P. 114°, $[\alpha]_D+67°$ (c. 0.7 in $CHCl_3$), λ max. 237 mμ (ε 18,000). (Found (percent): C, 76.4; H, 7.8. $C_{27}H_{33}FO_3$ requires (percent): C, 76.4; H, 7.8.)

EXAMPLE 13

17α-ethynyl-11β-fluoro-oestr-4-ene-3β,17β-diol 3,17-diacetate

17α-ethynyl-11β-fluoro-17β-hydroxy - oestr - 4 - ene - 3-one (0.5 g.) in methanol (6 ml.) was treated with sodium borohydride (0.4 g.) in the presence of sodium methoxide (prepared from 0.05 g. of sodium) and the mixture was boiled under reflux for 2 hr. The solvents were evaporated in vacuo and the product was isolated with ether. The crude mixture of 3α and 3β alcohols (0.471 g.) was acetylated by treatment for 4 days at 25° with pyridine (6 ml.) and acetic anhydride (6 ml.). The mixture was poured into water and the steroid extracted into ether; the extract was washed with dilute hydrochloric acid, dilute sodium hydroxide and water. Evaporation of the ether and crystallisation of the residue twice from methanol gave 17α-ethynyl-11β-fluoro-oestr-4-ene-3β,17β-diol 3,17-diacetate as rectangular prisms (0.11 g., 17%), M.P. 170–171°. (Found (percent): C, 71.6; H, 7.7. $C_{24}H_{31}FO_4$ requires (percent): C, 71.6; H, 7.8.)

EXAMPLE 14

17β-acetoxy-17α-ethynyl-11β-fluoro-3-methoxyoestra-3,5(6)-diene

A mixture of 17α-ethynyl-11β-fluoro-3-methoxyoestra-3,5-(6)-dien-17β-ol (0.4 g.) pyridine (5 ml.) and acetic anhydride (5 ml.) was heated for 36 hrs. at 90°, in a nitrogen atmosphere. The cooled solution was poured into water containing excess sodium hydrogen carbonate and the precipitated steroid was filtered, dried and recrystallised from methanol to give 17β-acetoxy-17α-ethynyl-11β-fluoro-3-methoxyoestra-3,5(6)-diene as rectangular prisms (0.34 g., 75%), M.P. 162–170°, $[\alpha]_D$—200° (c. 0.58, chloroform), λ max. 240 mμ (ε 20,600). (Found (percent): C, 74.2; H, 8.1; F, 5.3. $C_{23}H_{29}FO_3$ requires (percent): C, 74.2; H, 7.85; F, 5.1.)

EXAMPLE 15

17β-acetoxy-17α-ethynyl-11β-fluoro-oestr-4-en-3-one

A mixture of 17α-ethynyl-11β-fluoro-19-nortestosterone (0.46 g.), acetic anhydride (5 ml.) and pyridine (5 ml.) was heated for 10 hr. at 90°. After dilution with water the steroid was filtered off, washed with water, dried, and crystallised, first from aqueous methanol, then twice from acetone-light petroleum (B.P. 60–80°) to give 17β-acetoxy-17α-ethynyl-11β-fluoro-oestr-4-en - 3 - one (0.16 g.), M.P. 158–160°, $[\alpha]_D+9°$ (c. 0.4 chloroform), λ max. 237 mμ (ε 17,200). (Found (percent): C, 73.8; H, 7.4. $C_{22}H_{27}FO_3$ requires (percent): C, 73.7; H, 7.6.)

EXAMPLE 16

17α-ethynyl-11β-fluoro-17β-hydroxy-5α-oestran-3-one

17α-ethynyl-11β-fluoro-19-nortestosterone (0.09 g.) in ether-dioxan (1:1, 6 ml.) was added to a solution of lithium in liquid ammonia (50 ml.) and after ca. 5 minutes, ammonium chloride (1 g.) was added. After evaporation of the ammonia, the product was isolated in chloroform, and crystallised from methanol to give 17α-ethynyl-11β-fluoro-17β-hydroxy-5α-oestran-3 - one as prisms, (0.034 g.), M.P. 250–251° (decomp. 234°) which had infrared and proton magnetic resonance spectra compatible with the stated structure.

EXAMPLE 17

(a) 17α-hydroxypregna-1,4,9-triene-3,20-dione

11β,17α-dihydroxypregna-1,4-diene - 3,20 - dione (55.5 g.), (prepared by the reduction of 21-iodo-prednisolone with sodium metabisulphite in aqueous dioxan) in anhydrous pyridine (825 ml.) at 14 to 16° was treated with dry recrystallised N-bromo-succinimide (40.2 g.). The solution was stirred at 14 to 16° for 25 minutes in the absence of light. Sulphur dioxide was blown gently over the surface of the stirred solution until there was no reaction to acidified starch/iodide paper. Water (3 l.) was added, dropwise at first and then more rapidly. The mixture was poured into an excess of 2 N-aqueous hydrochloric acid (about 5 l.) and stirred for a few minutes, and the product was collected, washed thoroughly with water and dried over phosphorus pentoxide in vacuo to yield 46.9 g. (89%.) of 17α-hydroxy-pregna-1,4,9-triene-3,20-dione M.P. 187–192°. Recrystallisation of a small quantity from acetone afforded material, M.P. 215–217°.

(b) 3,17α-dihydroxy-19-norpregna-1,3,5,(10),9-tetraen-20-one

17α-hydroxypregna-1,4,9 - triene - 3,20 - dione (64 g.), zinc chloride (47 g.), activated zinc (1 kg.), dry industrial methylated spirits (5 l.), pyridine (500 ml.) and water (50 ml.) were refluxed gently with stirring for 3 hours. The zinc was filtered off and washed with hot industrial methylated spirits and the combined washings and filtrate were evaporated under reduced pressure to about 700 ml. The solution was poured into water (10 l.) containing an excess of hydrochloric acid and after stirring for some minutes the product was collected, washed thoroughly with water and dried to give 59.5 g. (97%) of 3,17α-dihydroxy-19-norpregna-1,3,5(10),9-tetraen - 20 - one M.P. 211–214°.

A small amount of this material crystallised from acetone to yield the pure phenol as pale yellow prisms, M.P. 234–236°. $[\alpha]_D+151°$ (dioxan, c. 0.88); $\lambda_{max.}$ 263 nm. (ε 18,500) and 299 nm. (ε 2,900). (Found (percent): C, 76.6, 76.4; H, 8.1, 7.8. $C_{20}H_{24}O_3$ requires (percent): C, 76.9; H, 7.75.)

(c) 17α-hydroxy-3-methoxy-19-norpregna-1,3,5(10),9-tetraen-20-one 3,17α-dihydroxy-19-norpregna-1,3,5(10),9-tetraen - 20-one (59.5 g.) anhydrous potassium carbonate (250 g.), dimethyl sulphate (150 ml.) and acetone (2 l.) were refluxed gently with stirring for 4 hours. Water (3 l.) was added solwly and the mixture was allowed to cool slowly with stirring overnight. The crystalline product was collected, washed thoroughly with water and dried over phosphorus pentoxide in vacuo to afford 17α-hydroxy-3-methoxy-19-norpregna-1,3,5(10),9-tetraen - 20 - one. (58.2 g., 94%) as colourless leaves M.P. 188–191°. Recrystallisation of a small quantity from acetone/cyclohexane afforded a pure sample M.P. 201–203° $[\alpha]_D+150°$ (dioxan, c. 0.81), $\lambda_{max.}$ 262 nm. ($\epsilon$ 19,900) and 298 nm. ($\epsilon$ 2,900). (Found (percent): C, 77.3; H, 7.9. $C_{21}H_{26}O_3$ requires (percent): C, 77.25; H, 8.05.)

(d) 20,20-ethylenedioxy-3-methoxy-19-norpregna 1,3,5(10),9-tetraen-17α-ol

17α - hydroxy - 3 - methoxy - 19 - norpregna - 1,3,5(10),9-tetraen-20-one (20 g.), pyridine hydrochloride (2.2 g.), dry ethylene glycol (200 ml.) and dry diglyme (400 ml.) were adjusted to pH 4 with concentrated hydrochloric acid and the solution was distilled very slowly at 120–130° under nitrogen at 220 mm. until examination by thin-layer chromatography indicated that the reaction was complete. The reaction mixture was poured into very dilute sodium hydroxide (5.1) and the precipitated crude 20,20 - ethylenedioxy - 3 - methoxy - 19 - norpregna-1,3,5(10),9-tetraen-17α-ol was collected, washed thoroughly and dried to afford an amorphous powder (21.9 g., 96%).

Recrystallisation of a small amount from methanol containing a trace of pyridine gave the pure ketal as colourless prisms, M.P. 164–166°, $[\alpha]_D+93°$ (dioxan, c. 0.83), $\lambda_{max.}$ 262 nm. ($\epsilon$ 19,400) and 298 nm. (inflexion, $\epsilon$ 3,300) (Found (percent): C, 74.7; H, 8.0. $C_{23}H_{30}O_4$ requires (percent): C, 74.55; H, 8.15%).

(e) 20,20-ethylenedioxy-3-methoxy-19-norpregna-1,3,5(10)-triene-11α,17α-diol 20,20 - ethylenedioxy - 3 - methoxy - 19 - norpregna-1,3,5(10),9-tetraen-17α-ol (21 g.) in dry diglyme (400 ml.) was treated at 0° with a stream of diborane generated externally in dry nitrogen. The diborane was generated by the slow addition of boron trifluoride etherate (100 ml.) in anhydrous ether (100 ml.) and dry diglyme (100 ml.) to a stirred slurry of sodium borohydride (40 g.) and diglyme (400 ml.). After 2 hours the reaction mixture was allowed to warm to room temperature and the addition of diborane was continued for a further 3 hours. The solution was cooled and 2 N-sodium hydroxide (200 ml.) was added, followed by 30% hydrogen peroxide (50 ml.). The mixture was allowed to stand at room temperature for 20 minutes and was partitioned between ether and water. The ether layer was washed well with water, 5% aqueous ferrous sulphate, again with water and dried over magnesium sulphate, and the solution was evaporated to leave a colourless foam. Chromatography over silica gel afforded pure 20,20-ethylenedioxy-3-methoxy-19-norpregna-1,3,5(10)-triene-11α,17α-diol as a colourless froth (12 g., 55%). A small quantity was crystallised from ether to give colourless prisms, M.P. 104–106°, $[\alpha]_D-49°$ (dioxan, c. 1.0), $\lambda_{max.}$ 276.5 nm. ($\epsilon$ 1,690) and 282.5 nm. ($\epsilon$ 1,570) (Found (percent): C, 71.1; H, 8.3. $C_{23}H_{32}O_5$ requires (percent): C, 71.1; H, 8.3.)

(f) 11α,17α-dihydroxy-19-norpregna-3-ene-3,20-dione 20,20 - ethylenedioxy - 3 - methoxy - 19 - norpregna-1,3,5(10)-triene-11α,17α-diol (12 g.) in dry tetrahydrofuran (400 ml.) was added to a stirred solution of liquid ammonia (800 ml.) and dry t-butanol (400 ml.). Freshly cut lithium (12 g.) was added and the mixture was stirred under reflux for 6 hours. Ethanol (400 ml.) was added and the ammonia was allowed to evaporate overnight. The remaining solvents were removed under reduced pressure and the residue was partitioned between ether and water. The ether layer was evaporated and the residual gum was refluxed for 3 hours in methanol (400 ml.) containing water (150 ml.) and concentrated hydrochloric acid (40 ml.). The yellow solution was partitioned between chloroform and water, the organic phase was washed with water, dried and evaporated and the colourless residue was crystallised twice from ethyl acetate/cyclohexane to afford 11α,17α-dihydroxy-19-norpregn-4-ene-3,20-dione (4.5 g., 44%). as colourless prisms.

A small amount was recrystallised to afford an analytical sample, M.P. 182–183°, $[\alpha]_D-21°$ (dioxan, c. 0.94), $\lambda_{max.}$ 240.5 nm. ($\epsilon$ 15,900) (Found (percent): C, 15; H, 8.4. $C_{20}H_{28}O_4$ requires (percent): C, 72.25; H, 8.5.)

(g) 11β-fluoro-17α-hydroxy-19-norpregn-4-ene-3,20-dione

11α,17α - dihydroxy - 19 - norpregn - 4 - ene - 3,20-dione (5 g.) in stirred dry tetrahydrofuran (100 ml.) at room temperature was treated with N-(2-chloro-1,1,2-trifluoroethyl)-diethylamine (5.6 ml.). After 72 hours the reaction was poured into stirred ice-cold water (1 l.) and the solid (4.44 g.) was collected by filtration. Partial purification by preparative thin-layer chromatography gave the crude 11β-fluoro compound (2.25 g.).

A sample of this material (1.5 g.) in dry chloroform (50 ml.) was treated at room temperature with m-chloroperbenzoic acid (1 mmole.). After stirring for 2 hours the solution was poured into ether (300 ml.), washed with dilute aqueous sodium hydrogen carbonate solution and then water. The organic extract was then dried (MgSO$_4$) and evaporated under reduced pressure. The residue was purified by preparative thin-layer chromatography and crystallisation from acetone/hexane to give 11β-fluoro-17α-hydroxy-19-norpregn-4-ene-3,20-dione in two crops (777 mg. and 100 mg.).

The main crop had M.P. 202–204°, $[\alpha]_D+80.4°$ (c. 0.86 dioxan), $\lambda_{max.}$ 238 nm. ($\epsilon$ 17,200). Found (percent): C, 71.8; H, 8.0; F, 5.2. $C_{20}H_{27}FO_3$ requires (percent): C, 71.85; H, 8.15; F, 5.7.)

EXAMPLE 18

17α-acetoxy-11β-fluoro-19-norpregn-4-ene-3,20-dione

11β - fluoro - 17α - hydroxy - 19 - norpregn - 4 - ene-3,20-dione (323 mg.) in refluxing dry benzene (25 ml.) under a slow stream of nitrogen was treated with isopropenyl acetate (5 ml.) followed by toluene-p-sulphonic acid monohydrate (50 mg.). The solution was distilled slowly for 4 hours, a further quantity of isopropenyl acetate (2 ml.) in dry benzene (8 ml.) being added after 1.5 hours. After 4 hours the solution was cooled and pyridine (0.5 ml.) was added. The neutralised solution was poured into ethyl acetate (100 ml.), washed twice with water (100 ml.), dried (Na$_2$SO$_4$) and evaporated under reduced pressure to give crude 3,17α-diacetoxy-11β-fluoro-19-norpregna-3,5-diene-20-one. This material (390 mg.) in dry tetrahydrofuran (20 ml.) was treated at room temperature with sodium methoxide in methanol (1 mmole. in 6.5 ml.). The solution was stirred for 10 minutes, acidified with dilute hydrochloric acid and poured into ether. The solution formed was washed twice with water, dried (MgSO$_4$) and evaporated to leave a white froth (324 mg.).

This was purified by preparative thin layer chromatography and crystallised from ether to afford 17α-acetoxy-11β-fluoro-19-norpregn-4-ene-3,20-dione (125 mg.) as colourless needles, M.P. 212–215°, $[\alpha]_D+29°$ (c., 0.89 dioxan), $\lambda_{max.}$ 236 nm. ($\epsilon$ 16,800). (Found (percent): C, 70.0; H, 7.6. $C_{22}H_{29}FO_4$ requires (percent): C, 70.15; H, 7.75.)

EXAMPLE 19

(a) 3,11α,17α-triacetoxy-19-norpregna-3,5-dien-20-one

11α,17α - dihydroxy - 19 - norpregn-4-ene-3,20-dione (1.964 g.), in refluxing dry benzene (100 ml.) under nitrogen was treated with isopropenyl acetate (10 ml.) and toluene-p-sulphonic acid monohydrate (100 mg.). The solution was distilled slowly for 5 hours. Pyridine (0.5 ml.) and ether (300 ml.) were then added and the solution was washed with water, dried ($Na_2SO_4$) and evaporated. Crystallisation of the residue from ether gave the title compound (1.679 g., 62%), M.P. 97–100°. Further recrystallisation from ether gave material with M.P. 124–127°, $[\alpha]_D$ —185° (c., 0.92, dioxan), $\lambda_{max.}$ 233.5 nm. ($\epsilon$ 16,400). (Found (percent): C, 66.55; H, 7.4. $C_{26}H_{34}O_7,\frac{1}{2}H_2O$ requires (percent): C, 66.75; H, 7.55.)

(b) 17α-acetoxy-11α-hydroxy-19-norpregn-4-ene-3,20-dione 3,11α,17α - triacetoxy - 19-norpregna-3,5-dien-20-one (891 mg.) and potassium hydrogen carbonate (203 mg.) in methanol (20 ml.) were heated under reflux in a nitrogen atmosphere for 90 minutes. The solution was then poured into water (400 ml.), acidified with dilute hydrochloric acid and extracted with chloroform. The extract was dried ($MgSO_4$) and evaporated and the residue was purified by preparative layer chromatography and crystallisation from acetone/hexane to give the title compound (13%), M.P. 228–229°, $\lambda_{max.}$ 240 nm. ($\epsilon$, 16,900). (Found (percent): C, 70.2; H, 8.0. $C_{22}H_{30}O_5$ requires (percent): C, 70.55; H, 8.05.)

(c) 17α-acetoxy-11β-fluoro-19-norpregn-4-ene-3,20-dione

17α - acetoxy - 11α - hydroxy-19-norpregn-4-ene-3,20-dione (0.02 g.) in dry tetrahydrofuran (0.5 ml.) was treated with N-(2 - chloro-1,1,2-trifluoroethyl)-diethylamine (0.02 ml.). After 44 hours, the reaction mixture was purified by preparative thin layer chromatography to give a foam (0.013 g., 65%), $\lambda_{max.}$ (in EtOH) 236.5, 299 nm.

($E_{1\,cm}^{1\%}$ 365. 75)

which from its ultraviolet spectrum contained ca. 85% of the title compound.

We claim:
1. A 9α-unsubstituted 11β-fluoro-19-norsteroid of the androstane or pregnane series selected from the group consisting of
  (a) such a steroid substituted at the 3-position by an oxo, protected oxo, hydroxy, or protected hydroxy group and possessing a double bond at the 4,5-position; and
  (b) such a steroid substituted at the 3-position by a protected hydroxy group and possessing double bonds at both the 3,4 and 5,6 positions; wherein
    the steroid is substituted at the 17-position by a member selected from the group consisting of an hydroxy group; a protected hydroxy group selected from the group consisting of an aliphatic acyloxy group having 1–9 carbon atoms in the aliphatic portion, a cycloaliphatic acyloxy group having up to 7 carbon atoms in the cycloaliphatic portion, a monocarbocyclic arylacyloxy group, a monocarboxylic araliphatic acyloxy group having 1–9 carbon atoms in the aliphatic portion, an alkoxy group having 1–5 carbon atoms and a monocyclic aralkoxy or aryloxy group; an oxo group; a protected oxo group selected from the group consisting of a ketal and an enol-ether group; and an aliphatic group selected from the class consisting of an acetyl group, an aliphatic acyloxy acetyl group having 1–9 carbon atoms in said aliphatic group, an unsubstituted saturated aliphatic group, an unsubstituted unsaturated aliphatic group and an unsaturated aliphatic group substituted by a chlorine atom, there being present at the 17-position in addition to said aliphatic group a member of the class consisting of an hydrogen atom, an hydroxy group and said protected hydroxy group.

2. The steroid of claim 1 wherein said steroid possessing a double bond at the 4,5-position and is substituted at the 3-position by an oxo group.

3. 11β-fluoro-oestr-4-ene-3,17-dione.

4. A compound selected from the group consisting of 17α - ethynyl - 11β-fluoro-oestr-4-ene-3β,17β-diol and its diacetate.

5. 17α - ethynyl - 11β-fluoro-3-methoxyoestra-3,5 (6)-dien-17β-ol.

6. 17α-ethynyl-11β-fluoro-19-nortestosterone.

7. 17β-acetoxy-17α-ethynyl-11β-fluoro-oestr - 4 - ene-3-one.

8. 11β - fluoro - 17α - hydroxy-19-norpregn-4-ene-3,20-dione.

9. 17α - acetoxy - 11β - fluoro-19-norpregn-4-ene-3,20-dione.

References Cited

UNITED STATES PATENTS 3,056,807  10/1962  Ayer _____ 260—397.3

OTHER REFERENCES

Barton et al., Journ. Amer. Chem. Soc., 88, July, 1966, pp. 3016–21, pp. 3018 and 3019 pertinent.

LEWIS GOTTS, Primary Examiner

ETHEL G. LOVE, Assistant Examiner

U.S. Cl. X.R.

195—51; 260—239.55 C, 397.45, 397.5; 424—238, 242, 243